United States Patent Office 3,195,308
Patented July 20, 1965

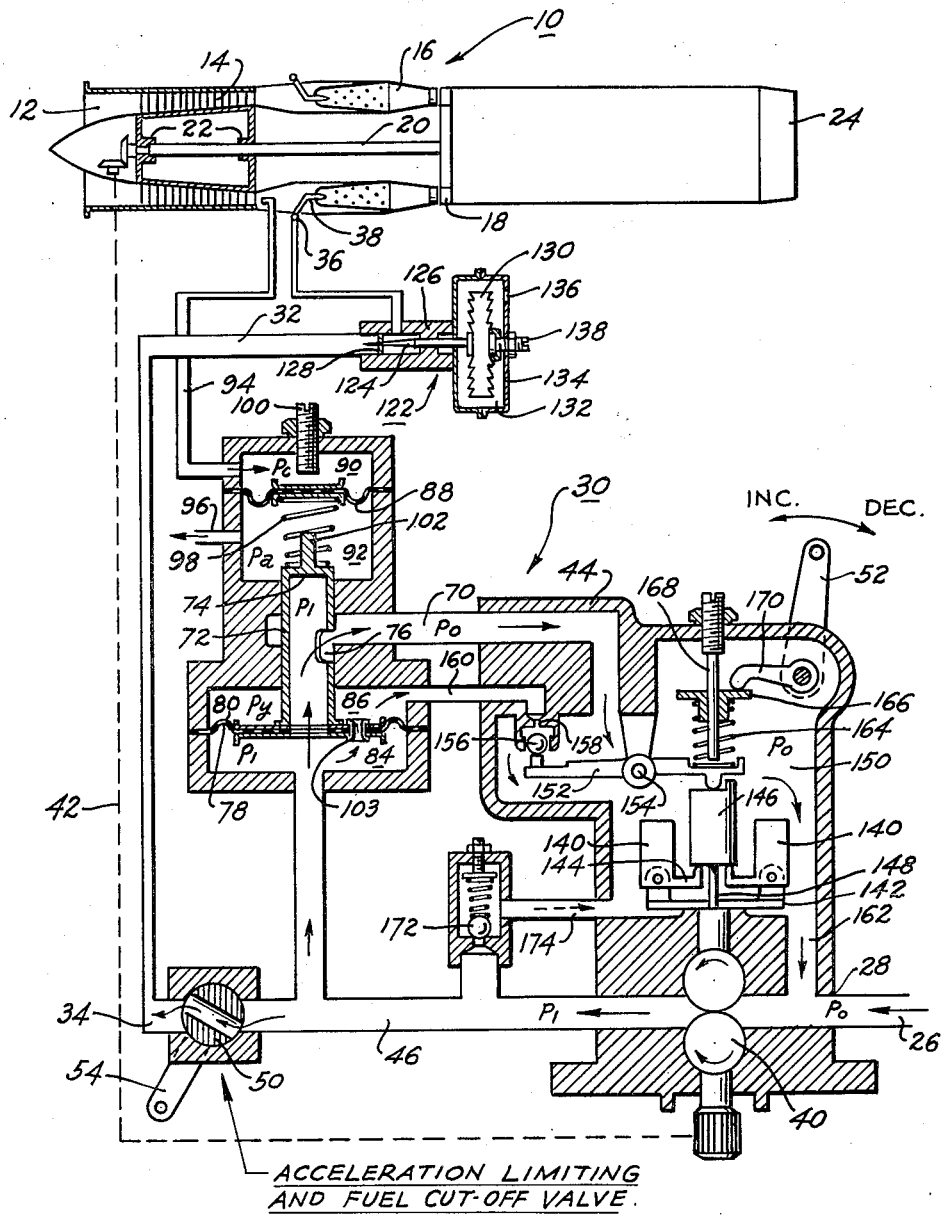
FIG_2

3,195,308
FUEL CONTROL FOR COMBUSTION ENGINE
Howard L. McCombs, Jr., South Bend, Ind., assignor to The Bendix Corporation, South Bend, Ind., a corporation of Delaware
Filed Oct. 17, 1962, Ser. No. 231,103
6 Claims. (Cl. 60—39.28)

This invention relates to a fuel control for a combustion engine and, in particular, to a gas turbine engine fuel control.

The present invention constitutes an improvement over existing fuel control apparatus wherein fuel flow to a gas turbine engine is regulated by varying the effective flow area of a fuel metering governor orifice as a function of throttle lever position and engine speed. The fuel pressure differential across the metering orifice is normally controlled by a fuel by-pass valve which maintains a constant pressure differential across the metering orifice or which controls the pressure differential across the metering orifice as a function of some variable condition of engine operation to which the by-pass valve is responsive. Such an arrangement possesses one disadvantage in that the fuel pump is subjected to relatively high fuel back pressure load at the discharge side thereof as the governor orifice restricts fuel flow during governor operation at a selected speed. The present invention avoids such undesirable pressure loading of the fuel pump by utilizing the fuel by-pass valve as a governor valve to thereby reduce the fuel back pressure against the discharge side of the fuel pump which reduces the pressure load on the fuel pump accordingly. As a result of the reduced pressure load, there is less energy expended in driving the fuel pump as well as an increase in pump life and a decrease in the amount of energy in the form of heat dissipated by the pressurized fuel discharged by the pump.

It is therefore an object of the present invention to provide a simple and effective fuel control system for a gas turbine engine.

It is another object of the present invention to provide a fuel control system wherein the fuel pump pressure loading is minimized during governor operation.

It is still another object of the present invention to provide fuel control apparatus embodying pressure regulator mechanism responsive to throttle lever position and engine speed which regulates the fuel pressure at the discharge side of an engine driven positive displacement fuel pump to thereby minimize fuel pump back pressure during engine governing at a selected engine speed.

Other objects and advantages will become apparent from the following description taken in conjunction with the accompanying drawings wherein:

FIGURE 2 represents a schematic sectional view of a fuel control embodying a modified form of the present invention.

Figure 1:
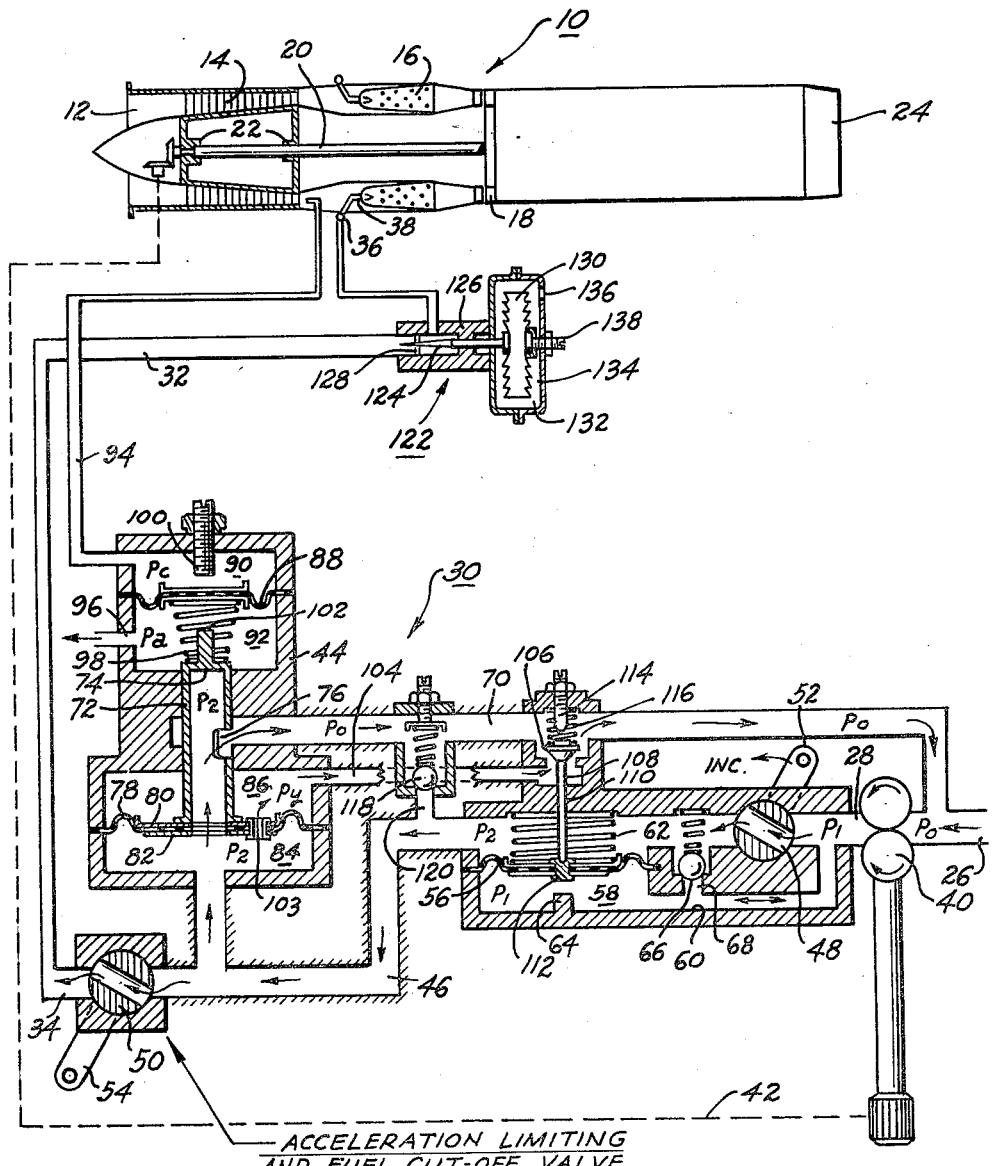
FIGURE 1 represents a schematic sectional view of a gas turbine engine and associated fuel control embodying the present invention.

Referring to FIGURE 1, numeral 10 represents a gas turbine engine having an air inlet 12 leading to an air compressor 14 which discharges pressurized air to combustion chambers 16 from which hot motive gas is discharged to a turbine 18 which, in turn, drives the compressor 14 via a shaft 20 suitably supported in bearings 22. The products of combustion pass through the turbine 18 to a discharge nozzle 24 from which the gases issue to the atmosphere to thereby provide propelling thrust. Pressurized fuel is supplied to the combustion chambers 16 from a source of fuel, not shown, via a conduit 26 leading to the inlet 28 of a fuel control generally indicated by 30, a conduit 32 leading from an outlet 34 of the fuel control 30, an annular fuel manifold 36 and fuel nozzles 38. An engine driven gear type positive displacement fuel pump 40 driven by the engine through a conventional gear and shaft arrangement 42 serves to pressurize the fuel supplied to fuel control 30.

The fuel control 30 includes a casing 44 having a main fuel flow conduit 46 therein leading from inlet 28 to outlet 34. The fuel flow supplied to conduit 46 is a function of the speed of rotation of pump 40. The fuel flow through conduit 46 to the engine is controlled by variable area valve members 48 and 50 actuated by manually operated control levers 52 and 54, respectively. A fuel pressure differential $P_1 - P_2$ across valve member 48 is sensed by a diaphragm 56 exposed on one side to the fuel pressure $P_2$ in conduit 46 downstream from valve member 48 and exposed on the opposite side to the fuel pressure $P_1$ in a chamber 58 connected to conduit 46 upstream from valve member 48 via a passage 60. A spring 62 interposed between casing 44 and diaphragm 56 serves to bias diaphragm 56 toward a fixed stop member 64 against the opposing force derived from pressure differential $P_1 - P_2$ acting across diaphragm 56. A normally closed spring loaded check valve 66 suitably arranged in a passage 68 between passage 60 at pressure $P_1$ and conduit 46 at pressure $P_2$ opens at a predetermined fuel pressure differential $P_1 - P_2$ thereby limiting the fuel pressure differential $P_1 - P_2$ imposed across diphragm 56.

A fuel by-pass conduit 70 connects conduit 46 at fuel pressure $P_2$ with conduit 26 at fuel pump inlet pressure $P_0$. A tubular valve 72 slidably carried in casing 44 is provided with a closed end 74 and an orifice 76, the latter being arranged in series with conduit 70 for controlling the effective flow area thereof. A diaphragm 78 fixedly secured at its inner portion to valve 72 by any suitable means including backing plates 80 and 82 and fixedly secured at its outer portion to casing 44 is exposed to fuel pressures $P_2$ and $P_y$ in chambers 84 and 86, respectively. A diaphragm 88 fixedly secured at its outer portion to casing 44 is responsive to compressor discharge air pressure $P_c$ and atmospheric air pressure $P_a$ in chambers 90 and 92, respectively. Passages 94 and 96 communicate chambers 90 and 92 with sources of compressor discharge air pressure $P_c$ and atmospheric air pressure, respectively. A spring 98 interposed between diaphragm 88 and the closed end 74 of valve 72 serves as a force transmitting medium to load valve 72 in response to the force derived from diaphragm 88. An adjustable stop 100 threadedly engaged with casing 44 is adapted to be engaged by diaphragm 88 and an extended portion 102 of valve 72.

A fixed area restriction 103 fixedly secured to diaphragm 78 permits fuel to flow from chamber 82 to chamber 84. The chamber 84 is vented to conduit 70 at fuel pump inlet pressure $P_0$ via a passage 104 containing a valve 106 which controls the effective flow area of passage 104. The valve 106 is provided with a stem 108 which is slidably carried in an opening 110 in casing 44 through which it extends into engagement with a bearing member 112 fixedly secured to diaphragm 56. A stop member 114 threadedly engaged with casing 44 is adapted to be engaged by valve 106 to thereby limit the travel of the same in an opening direction. A spring 116 interposed between casing 44 and valve 106 maintains a preload against valve 106 in a closing direction.

A spring loaded pressure relief valve 118 in a passage 120 connecting conduit 46 at fuel pressure $P_2$ establishes an upper limit on the fuel pressure $P_2$.

The fuel flow requirements of an engine vary in accordance with changes in atmospheric temperature and/or pressure and it is the usual practice to compensate for these variables by adjusting fuel flow accordingly. To this end, an adjustable valve mechanism 122 is arranged in series flow relationship with fuel conduit 32. The valve structure 122 includes a tapered valve member 124 slidably carried in a casing 126 and suitably engaged with an orifice 128. An evacuated capsule 130 disposed in a chamber 132 formed by casing 134 fixedly secured to casing 126 by any suitable means, not shown, is fixedly secured to the valve member 124. Chamber 132 is vented to the atmosphere via opening 136. The capsule 130 is anchored in position by an adjustable stem 138 secured to one side of capsule 130 and threadedly engaged in an opening in casing 134. The valve member 124 is positioned in orifice 128 in response to expansion and contraction of capsule 130 in accordance with pressure variations in chamber 132 to thereby effect a corresponding change in effective flow area of orifice 128 which, in turn, modifies the flow of fuel to the combustion chambers 16 accordingly. It will be noted that changes in the effective flow area result in a constant percent change in fuel flow to combustion chambers 16. If desired, the capsule 130 may be replaced by conventional temperature responsive mechanism, not shown, connected to actutae the valve member 124 as a function of sensed atmospheric temperature. Also, the capsule 130 may be replaced by conventional temperature and pressure responsive mechanism, not shown, connected to actuate the valve member 124 as a function of sensed atmospheric temperature and pressure thereby providing air density connection for fuel flow.

OPERATION OF FIGURE 1

Assuming the engine to be operating at a steady state condition corresponding to a speed selected by the position of lever 52, the various component parts of the fuel control 30 will occupy the positions shown in FIGURE 1. It will be noted that the variable area valve 48 is in series with the total discharge of the fuel pump 40 which discharge, by virtue of the characteristics of the gear pump 40, varies in direct proportion to the fuel pump speed and thus engine speed. For a given flow area of valve 48 the fuel pressure differential $P_1-P_2$ thereacross varies as the square of engine speed and it will be understood that a certain engine speed is required to develop a certain pressure drop across a given flow area of valve 48. If the flow area of valve 48 is decreased, a lower engine speed will be required to develop the given pressure differential. Conversely, an increase in flow area of valve 48 will require a higher engine speed to develop the given pressure differential. The speed sense thus provided by the fuel pressure differential $P_1-P_2$ is sensed by diaphragm 56 which responds to variations from a predetermined constant value thereof caused by an off-speed condition of the engine and which governs fuel flow accordingly as will be described.

Valve 50, labeled as an acceleration limiting and fuel cut-off valve, is a two position valve which is throttle lever actuated to a closed position to shut-off fuel flow to the combustion chambers and to the open position shown in the drawings during engine operation. The valve 50 provides an effective fixed metering area in series with the fuel nozzles 38 and valve 124. The quantity of fuel flow to the combustion chambers is defined by the well known basic flow equation $W_f = CA\sqrt{P_2-P_c}$ wherein $W_f$ designates fuel flow, C is the conventional flow coefficient, A is the effective metering area defined by valve 50, valve 124 and fuel nozzles 38 and $P_2-P_c$ is the pressure differential maintained across the effective metering area. It will be noted that an increase and decrease in the effective metering area, A, results in a corresponding increase and decrease, respectively, of the fuel flow, $W_f$, for any given pressure differential $P_2-P_c$. Thus, any desired limit on the acceleration fuel flow schedule to the combustion chambers may be established by adjusting the valve 50 to an appropriate degree to provide the necessary effective metering area. Obviously, the valve 72 will function to maintain the same pressure differential $P_2-P_c$, for any given value of compressor discharge air pressure $P_c$ irrespective of the effective metering area, A.

Now, assuming that the lever 52 is moved to request a higher than existing speed, the valve 48 will move accordingly in an opening direction. The increase in effective flow area of valve 48 causes a decrease in fuel pressure differential $P_1-P_2$ whereupon diaphragm 56 moves downward under the influence of spring 62. Valve 106, in turn, moves to a closed position in response to the downward movement of diaphragm 56 thereby closing passage 104 causing the fuel pressure $P_y$ in chamber 86 to increase thus reducing the fuel pressure differential $P_2-P_y$ across diaphragm 78 to zero. Eliminating the pressure differential $P_2-P_y$ across diaphragm 78 results in downward movement of valve 72 and a corresponding reduction in the by-pass fuel flow through orifice 76 in accordance with the unbalance of opposing forces derived from air pressure differential $P_c-P_a$ acting across diaphragm 88 and fuel pressure $P_2$ acting against the closed ends 74 of valve 72.

The resulting increase in $P_2$ fuel pressure produces a corresponding increase in fuel flow to the engine which causes the engine to accelerate which, in turn, causes the compressor discharge pressure $P_c$ and speed of fuel pump 40 to increase accordingly. The increase in air pressure $P_c$ results in an increase in the $P_c-P_a$ differential acting against diaphragm 88 which in turn, causes a corresponding increase in pressure $P_2$ and thus fuel flow to the combustion chambers 16 by virtue of closing movement of valve 72. Thus, the acceleration fuel flow schedule to the engine increases as a function of the fixed metering area of valve 50 and the pressure differential across valve 50 which pressure differential increases with increasing fuel pressure $P_2$ as a function of the air pressure differential $P_c-P_a$. As the engine speed approaches the selected speed, the fuel pressure differential $P_1-P_2$ increases toward the predetermined constant value which indicates an on-speed engine condition. At the selected speed, the fuel pressure differential $P_1-P_2$ reaches the predetermined value whereupon diaphragm 56 responds thereto and moves upward against the resistance of spring 62. The valve 106, in turn, is actuated by diaphragm 56 to an open position thereby venting chamber 86 to conduit 70 at fuel pump inlet pressure $P_0$. The resulting drop in fuel pressure $P_y$ and corresponding increase in fuel pressure differential $P_2-P_y$ across diaphragm 78 produces a force in opposition to the air pressure differential $P_c-P_a$ with the result that the valve 72 is biased upward causing an increase in the flow area of orifice 76 and a corresponding increase in by-pass fuel flow to conduit 70. The resulting decrease in $P_2$ pressure reduces fuel flow through conduit 46 to the engine and stabilizes at the value required to govern the engine at the selected speed. If engine speed should deviate from the selected speed, it will be noted that the fuel pressure differential $P_1-P_2$ across valve 48 and diaphragm 56 will vary accordingly from the predetermined constant value such that the resulting movement of diaphragm 56 and attached valve 106 will cause a modification of the fuel pressure differential $P_2-P_y$ across diaphragm 78 to thereby readjust the by-pass fuel flow to maintain engine speed constant at the selected speed.

An engine deceleration is accomplished by moving lever 52 in the opposite direction causing a decrease in the effective flow area of valve 48. The resulting increase in fuel pressure differential $P_1-P_2$ across valve 48 and diaphragm 56 urges diaphragm 56 upward causing opening movement of valve 106 and a subsequent increase in fuel pressure differential $P_2-P_y$ across diaphragm 78 which, in turn, urges valve 72 toward its fully open position to increase the quantity of by-pass fuel flow. The resulting decrease in $P_2$ pressure reduces fuel flow to the engine causing the engine to decelerate to the speel requested by the position of the lever 52 whereupon engine speed is stabilized in the aforementioned manner upon reaching the predetermined fuel pressure differential $P_1-P_2$.

The spring 98 is provided to establish a predetermined minimum fuel pressure $P_2$ for engine start operation. During engine starting, the air pressure differential $P_c-P_a$ across diaphragm 88 is substantially zero and the diaphragm 88 is biased against stop 100. The spring 98 which bears against diaphragm 88 urges valve 72 to a closed position thereby preventing by-pass fuel flow until a predetermined minimum value of fuel pressure $P_2$ is reached at which time the pressure $P_2$ acting against the closed end 74 overcomes the spring 98. When the force derived from the air pressure differential $P_c-P_a$ acting across diaphragm 88 increases sufficiently to overcome the load of spring 98, the diaphragm 88 moves away from stop 100 and fuel pressure $P_2$ then becomes a function of the air pressure differential $P_c-P_a$.

Referring to FIGURE 2 which illustrates a second embodiment of the present invention, the structural elements shown therein which are similar to those shown in FIGURE 1 are designated by like numerals. The major difference between the fuel controls of FIGURES 1 and 2 lies in the substitution of a flyweight speed governor mechanism in FIGURE 2 for the hydraulic governor mechanism of FIGURE 1.

As shown in FIGURE 2, fuel at pressure $P_0$ enters inlet 28 and flows through conduit 46 to outlet 34. Engine driven fuel pump 40 disposed in casing 44 serves to pressurize the fuel flowing through conduit 46 at pressure $P_1$. Centrifugal flyweights 140 pivotally mounted on a rotatable support 142 are each provided with radially inwardly extending arms 144 which engage a thrust bearing 146 slidably carried by a rod 148 fixedly secured to and extending from support 142. The rotatable support 142 is contained by a chamber 150 and is suitably journaled in casing 44 and driven by the compressor 14 via the gear and shaft arrangement 42. The thrust bearing 146 bears against one end of a lever 152 pivotally mounted on a support 154 extending from casing 44. The opposite end of lever 152 is adapted to engage a ball valve 156 which cooperates with an orifice 158 formed at the discharge end of a passage 160 leading from chamber 86 at fuel pressure $P_y$ to chamber 150 at fuel pump inlet pressure $P_0$. A passage 162 communicates chamber 132 with conduit 46 upstream from fuel pump 40. A governor spring 164 interposed between the one end of lever 152 and a spring retaining member 166 slidably carried on an adjustable rod 168 serves to load thrust bearing 146 in opposition to the output force of flyweights 140. A lever 170 fixedly secured to lever 52 and movable therewith engages spring retaining member 166 and serves to position the same thereby varying the loading effect of spring 164 as a function of the position of lever 52.

A spring loaded relief valve 172 disposed in a conduit 174 leading from conduit 46 at fuel pump discharge pressure $P_1$ to chamber 150 at fuel pump inlet pressure $P_0$ opens at a predetermined value of pressure $P_1$ thereby providing a maximum limit on the same.

Valve 72 is variably positioned by opposing forces derived from the air pressure differential $P_c-P_a$ acting across diaphragm 88 which acts in opposition to the fuel pump discharge pressure $P_1$ acting against the closed end 74 and the fuel pressure differential $P_1-P_y$ acting across diaphragm 78. The pressure $P_y$ in chamber 86 is controlled as a function of engine speed and the position of lever 52 by the ball valve 138.

OPERATION OF FIGURE 2

Assuming engine operation to be steady state at a speed corresponding to the speed selected by the lever 52, the various component parts will occupy the positions shown in FIGURE 2. The valve 72 is stabilized in response to equal and opposite forces acting thereagainst with the resulting position of the valve 72 being a function of the differential between compressor discharge air pressure $P_c$ and atmospheric air pressure $P_a$ and the differential between fuel pump discharge fuel pressure $P_1$ and fuel pressure $P_y$, the latter pressure $P_y$ being a function of engine speed and the position of lever 52.

Assuming that the lever 52 is moved to request a higher than existing speed, the spring 164 is compressed accordingly thereby increasing the load against thrust bearing 146 and overcoming the force of flyweights 140. The lever 152, in turn, pivots clockwise as viewed in FIGURE 2 causing ball valve 156 to close orifice 158 thereby interrupting the flow of fuel from chamber 86 to chamber 150. The fuel pressure differential $P_1-P_y$ decreases to zero and the valve 72 is unbalanced in a closing direction causing a reduction in flow area of orifice 76 and a corresponding reduction in by-pass flow therethrough which, in turn, results in an increase in $P_1$ fuel pressure and a corresponding increase in fuel flow through conduits 46 and 32 to the combustion chambers 16. As the engine accelerates in response to the increased fuel flow, the compressor discharge air pressure $P_c$ increases correspondingly. The resulting increase in fuel pressure $P_1$ acting against the closed end 74 of valve 72 is opposed by the increase in air pressure differential $P_c-P_a$ acting across diaphragm 88 causing the position of the valve 72 and thus by-pass flow to vary thereby maintaining a predetermined relationship between the pressure differential $P_c-P_a$ and fuel pressure $P_1$ which, in turn, results in a corresponding predetermined acceleration fuel flow schedule to the engine. As the engine speed approaches the selected speed, conventional governor break operation occurs wherein the force of flyweights 140 overcomes the force of spring 164 causing lever 152 to pivot counterclockwise thereby displacing ball valve 156 away from orifice 158 causing a reduction in fuel pressure $P_y$ in chamber 86. The resulting increase in fuel pressure differential $P_1-P_y$ across diaphragm 78 urges valve 72 upward causing an increase in area of orifice 72 and a corresponding increase in by-pass flow which, in turn, reduces $P_1$ fuel pressure and thus fuel flow through conduits 46 and 32 to combustion chambers 16. Upon reaching the selected speed, the forces of flyweights 140 and spring 164 balance thereby stabilizing lever 152 and ball valve 158 which, in turn, regulates the fuel pressure $P_y$ and thus fuel pressure differential $P_1-P_y$ to a substantially constant value. The valve 72, in turn, is stabilized thereby regulating the by-pass flow and thus fuel flow to the combustion chambers 16 to the value required to maintain engine speed at the selected speed.

Engine deceleration is accomplished by moving lever 52 in the decreasing speed direction whereupon the force of spring 164 is decreased allowing the force of flyweights 140 to rotate lever 152 counterclockwise which, in turn, causes ball valve 156 to move away from orifice 158. The resulting increase in fuel pressure differential $P_1-P_y$ urges valve 72 upward causing an increase in by-pass flow and a subsequent decrease in $P_1$ fuel pressure and thus fuel flow to the engine whereupon engine speed decreases. Upon reaching the newly selected engine speed, the forces of flyweights 140 and spring 164 balance out causing stabilization of ball valve 156 and fuel pressure differential $P_1-P_y$ at which time fuel flow is regulated at the value required to maintain engine speed at the newly selected speed in the manner heretofore mentioned.

The governor operation imposed on the by-pass valve 72 results in a reduction of the fuel pressure $P_1$, which, in turn, reduces the back pressure or loading on the pump 40 during governor operation thereby affecting longer pump life as well as a reduction in power expended to drive the pump.

Various changes and modifications of the structure disclosed in the drawings and described heretofore may be made by those persons skilled in the art without departing from the scope of applicant's invention. Various fluid seals which may be required to seal one fluid pressure from another and necessary access openings in casing 44 are not shown but may be provided as required by means of ordinary engineering practices.

I claim:

1. Fuel control apparatus for a combustion engine having a combustion chamber, an air compressor for supplying pressurized air to the combustion chamber and a control lever for controlling the speed of the compressor, said apparatus comprising:

a fuel supply conduit connected to deliver pressurized fuel to the combustion chamber;

an engine driven positive displacement fuel pump connected to deliver pressurized fuel to said fuel conduit;

a fuel bypass conduit connected to return fuel from said fuel conduit to the inlet of said pump;

bypass valve means operatively connected to said bypass conduit and provided with a predetermined surface area exposed to the fuel pressure in said fuel supply conduit for controlling fuel flow through said bypass conduit and thus the fuel pressure in said supply conduit;

first fluid pressure responsive means responsive to a compressor generated air pressure operatively connected to said bypass valve means for actuating the same in opposition to the fuel pressure in said supply conduit acting on said predetermined area;

second fluid pressure responsive means exposed to the fuel pressure in said supply conduit and a variable servo fluid pressure and responsive to the pressure differential therebetween operatively connected to said bypass valve means for actuating the same;

fluid flow control means including a servo valve for controlling said variable fluid servo pressure;

compressor speed governor means operatively connected to said servo valve for controlling the operation thereof as a function of compressor speed and the position of the control lever such that said servo valve occupies a closed position in response to an acceleration of said compressor to a selected higher speed and an open position in response to a deceleration of said compressor to a selected lower speed as well as during governing operation at a selected speed;

said bypass valve means being urged in an opening direction by the fuel pressure acting against said bypass valve means and by said second fluid pressure responsive means in response to the pressure differential generated thereacross as a result of said servo valve being opened in a closing direction by said first fluid pressure responsive means to thereby regulate the fuel flow through said bypass conduit and thus fuel pressure in said fuel conduit and fuel flow to the combustion chamber as a function of said compressor generated air pressure, control lever position and compressor speed.

2. Fuel control apparatus as claimed in claim 1 wherein said compressor speed governor means includes a governor speed weight rotated by the compressor and a governor spring adapted to variably preload said speed weight in response to movement of said control lever to select a compressor speed.

3. Fuel control apparatus as claimed in claim 1 wherein said compressor speed governor means includes variable area valve means in series flow relationship with the fuel flow discharged by said fuel pump and actuated by said control lever, and a pressure responsive member responsive to variations from a predetermined constant fuel pressure differential across said variable area valve means operatively connected to said servo valve.

4. Fuel control apparatus as claimed in claim 1 and further including a fixed stop member adapted to be engaged by said first pressure responsive means and a spring between said bypass valve means and said first pressure responsive means for biasing said first pressure responsive means into engagement with said stop member said spring being overcome by said first pressure responsive means in response to a predetermined value of said compressor generated pressure.

5. Fuel control apparatus for a combustion engine having a combustion chamber, an air compressor for supplying pressurized air to the combustion chamber and a control lever for controlling the speed of the compressor, said apparatus comprising:

a fuel conduit connected to deliver pressurized fuel to the combustion chamber;

an engine driven positive displacement fuel pump connected to deliver pressurized fuel to said fuel conduit;

a fuel bypass conduit connected to return fuel from said fuel conduit to the inlet of said fuel pump;

a bypass valve member operatively connected to said bypass conduit for controlling fuel flow therethrough and thus the fuel pressure in said fuel conduit;

means responsive to the fuel pressure in said fuel conduit operatively connected to said bypass valve member for actuating the same;

first fluid pressure differential responsive means responsive to atmospheric air pressure and a compressor generated air pressure operatively connected to said bypass valve member for actuating the same in opposition to said last named means;

second fluid pressure differential responsive means responsive to the fuel pressure in said fuel conduit and a variable servo fluid pressure operatively connected to said bypass valve member for actuating the same in opposition to said first fluid pressure differential responsive means;

fluid flow control means including a servo valve for controlling said variable servo fluid pressure;

compressor speed governor means operatively connected to said servo valve, the control lever and said compressor for actuating said servo valve as a function of the position of the control lever and compressor speed;

said servo valve being actuated to a closed position during an acceleration of the engine to a selected compressor speed to thereby reduce the pressure differential across said second fluid pressure differential responsive means to zero causing said bypass valve member to move in a closing direction which results in an increase in fuel pressure in said fuel conduit and a corresponding increase in fuel flow to the combustion chamber;

said bypass valve member being actuated by said first pressure differential responsive means to thereby regulate the fuel pressure in said fuel conduit as a function of the differential between atmospheric air pressure and said compressor generated air pressure only during said acceleration of the engine;

said servo valve being actuated to an open position as the compressor speed approaches said selected speed to thereby establish a pressure differential across said second fluid pressure differential responsive means which acts in opposition to said first pressure differential responsive means causing said bypass valve member to move in an opening direction which results in the fuel pressure in said fuel conduit and a corresponding reduction of fuel flow to the combustion chamber.

6. Fuel control apparatus for a combustion engine having a combustion chamber, an air compressor for supplying pressurized air to the combustion chamber and a control lever for controlling the speed of the compressor, said apparatus comprising:

a fuel conduit connected to deliver pressurized fuel to the combutsion chamber;

an engine driven positive displacement fuel pump connected to deliver pressurized fuel to said fuel conduit;

a fuel bypass conduit connected to return fuel from said fuel conduit to the inlet of said fuel pump;

bypass valve means operatively connected to said bypass conduit for controlling fuel flow therethrough and responsive to the fuel pressure in said fuel conduit;

a first diaphragm responsive to the differential between atmospheric air pressure and compressor discharge air pressure operatively connected to said bypass valve means and opposing the fuel pressure acting thereagainst for actuating the same to establish a fuel pressure in said fuel conduit which is a function of said differential air pressure;

a second diaphragm responsive to the differential between the fuel pressure in said fuel conduit and a variable servo fuel pressure derived from said fuel pressure operatively connected to said bypass valve means for actuating the same in opposition to the air pressure differential acting on said first diaphragm;

control means including a servo valve for controlling said variable servo fuel pressure; and compressor speed governor means responsive to the position of the control lever and compressor speed operatively connected to said servo valve for actuating the same in response to variations in compressor speed from a predetermined selected speed established by the position of said control lever;

said servo valve being actuated to a closed position during an acceleration of the engine to a predetermined selected compressor speed to thereby cause an increase in said servo fuel pressure and a corresponding reduction to zero of the pressure differential across said second diaphragm causing said bypass valve member to move in a closing direction which results in an increase in fuel pressure in said fuel conduit and a corresponding increase in fuel flow to the combustion chamber;

said fuel pressure in said fuel conduit and thus the flow of fuel to the combustion chamber being controlled by said bypass valve means in response to said air pressure differential during said acceleration of the engine to provide an acceleration fuel flow schedule which is a function of said air pressure differential only;

said servo valve being actuated to an open position by said governor means to effect a decrease in said servo fuel pressure and a corresponding increase in said pressure differential across said second diaphragm which acts in opposition to said first diagraphm to cause movement of said bypass valve member in an opening direction thereby reducing the fuel pressure in said fuel conduit and thus fuel flow to the combustion chamber thereby stabilizing engine operation at the selected compressor speed.

References Cited by the Examiner

UNITED STATES PATENTS

| | | | |
|---|---|---|---|
| 2,649,686 | 8/53 | Lawrence | 60—39.28 |
| 2,668,416 | 2/54 | Lee | 60—39.28 |
| 2,968,151 | 1/61 | Abraham | 60—39.28 |
| 3,067,580 | 12/62 | Kast | 60—39.28 |
| 3,073,115 | 1/63 | Cowles | 60—39.28 X |
| 3,078,669 | 2/63 | Williams | 60—39.28 |
| 3,105,354 | 10/63 | McCombs | 60—39.28 |

FOREIGN PATENTS 879,723  10/61  Great Britain.

SAMUEL LEVINE, *Primary Examiner.*

UNITED STATES PATENT OFFICE
CERTIFICATE OF CORRECTION

Patent No. 3,195,308

July 20, 1965

Howard L. McCombs, Jr.

It is hereby certified that error appears in the above numbered patent requiring correction and that the said Letters Patent should read as corrected below.

Column 8, line 2, after "member" insert a comma; line 63, after "in", first occurrence, insert -- a reduction in --.

Signed and sealed this 19th day of April 1966.

(SEAL)
Attest:

ERNEST W. SWIDER
Attesting Officer

EDWARD J. BRENNER
Commissioner of Patents